United States Patent
Terahara et al.

(10) Patent No.: US 12,407,055 B2
(45) Date of Patent: Sep. 2, 2025

(54) ENERGY STORAGE APPARATUS

(71) Applicant: GS Yuasa International Ltd., Kyoto (JP)

(72) Inventors: Ryoichi Terahara, Kyoto (JP); Noriyoshi Munenaga, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 538 days.

(21) Appl. No.: 17/915,993

(22) PCT Filed: Mar. 29, 2021

(86) PCT No.: PCT/JP2021/013166
§ 371 (c)(1),
(2) Date: Sep. 29, 2022

(87) PCT Pub. No.: WO2021/200771
PCT Pub. Date: Oct. 7, 2021

(65) Prior Publication Data
US 2023/0163398 A1    May 25, 2023

(30) Foreign Application Priority Data
Mar. 30, 2020 (JP) .................. 2020-061181

(51) Int. Cl.
*H01M 50/262* (2021.01)
*H01M 50/209* (2021.01)
*H01G 2/10* (2006.01)

(52) U.S. Cl.
CPC ....... *H01M 50/262* (2021.01); *H01M 50/209* (2021.01); *H01G 2/10* (2013.01)

(58) Field of Classification Search
None
See application file for complete search history.

(56) References Cited

U.S. PATENT DOCUMENTS

| | | |
|---|---|---|
| 6,228,528 B1 | 5/2001 | Burkholder et al. |
| 2009/0197154 A1 | 8/2009 | Takasaki et al. |
| 2011/0294000 A1 | 12/2011 | Kim et al. |
| 2014/0205878 A1 | 7/2014 | Ohgitani et al. |
| 2016/0329538 A1 | 11/2016 | Hughes |

(Continued)

FOREIGN PATENT DOCUMENTS

| | | |
|---|---|---|
| JP | S62-077864 U | 5/1987 |
| JP | H08-169242 A | 7/1996 |

(Continued)

OTHER PUBLICATIONS

Machine Translation JP 2018029014 (Year: 2018).*
International Search Report (ISR) (PCT Form PCT/ISA/210), in PCT/JP2021/013166, dated Jun. 8, 2021.

*Primary Examiner* — Wyatt P McConnell
(74) *Attorney, Agent, or Firm* — MCGINN I.P. LAW GROUP, PLLC

(57) ABSTRACT

An energy storage apparatus includes an outer case that accommodates an energy storage device and a reinforcing member. The reinforcing member includes the pair of reinforcing walls disposed so as to sandwich the two wall portions of the outer case from an outside of the outer case, the two wall portions opposedly facing each other, and the connecting portion connecting the pair of reinforcing walls to each other.

6 Claims, 6 Drawing Sheets

(56) References Cited

U.S. PATENT DOCUMENTS

| | | | |
|---|---|---|---|
| 2018/0111501 A1 | 4/2018 | Takeuchi et al. | |
| 2019/0140232 A1 | 5/2019 | Ogawa et al. | |

FOREIGN PATENT DOCUMENTS

| | | | |
|---|---|---|---|
| JP | 2009-087757 | A | 4/2009 |
| JP | 2011-249315 | A | 12/2011 |
| JP | 2012-160347 | A | 8/2012 |
| JP | 2013-133044 | A | 7/2013 |
| JP | 2014-139895 | A | 7/2014 |
| JP | 2014-170678 | A | 9/2014 |
| JP | 2018-029014 | A | 2/2018 |
| JP | WO2016/186139 | A1 | 3/2018 |
| JP | 2018-056097 | A | 4/2018 |
| JP | 2018-065513 | A | 4/2018 |
| JP | 2018-521447 | A | 8/2018 |
| JP | 2018-195378 | A | 12/2018 |
| JP | 2019-087526 | A | 6/2019 |

\* cited by examiner

ENERGY STORAGE APPARATUS

TECHNICAL FIELD

The present invention relates to an energy storage device, and an energy storage apparatus including an outer case that accommodates the energy storage device.

BACKGROUND ART

Patent Document 1 discloses an energy storage apparatus that includes: a body portion that accommodates a battery unit that has a plurality of batteries; and a reinforcing structure that is mounted on the body portion. This reinforcing structure includes: support struts that project upward beyond the body portion; and a receiving member that is fixed to upper portions of the support struts. Accordingly, even when any heavy object falls on the energy storage apparatus, a load (an impact load) can be received by the reinforcing structure and hence, the deformation, the rupture, and the like of the body portion are prevented.

PRIOR ART DOCUMENT

Patent Document

Patent Document 1: WO 2016/186139 A

SUMMARY OF THE INVENTION

Problems to be Solved by the Invention

In the above-mentioned conventional energy storage apparatus, in preparation for a case where some object impinges on the energy storage apparatus, the reinforcing structure (a reinforcing member) is disposed on the body portion (an outer case). However, a force acts on the outer case of the energy storage apparatus not only from the outside of the outer case but also from the inside of the outer case. When a gas is discharged from the energy storage device in the outer case, a pressure in the outer case (an internal pressure) sharply rises so that the outer case receives a force (the internal pressure) from the inside. Accordingly, the outer case is deformed so as to expand outward, and as a result, there is a possibility that a damage such as cracking occurs in the outer case. When a damage occurs on the outer case, there is a possibility that an unsafe phenomenon occurs. For example, a phenomenon that a gas in the outer case is leaked through a damaged portion occurs. Therefore, how to suppress such a defect of the outer case caused by a force that the outer case receives from the inside of the outer case is a crucial task from a viewpoint of increasing a safety of the energy storage apparatus.

The inventors of the present invention have made the present invention by focusing on the above-mentioned task from a novel viewpoint, and it is an object of the present invention to provide an energy storage apparatus where the safety of the energy storage apparatus is enhanced.

Means for Solving the Problems

An energy storage apparatus according to an aspect of the present invention includes: an outer case that accommodates an energy storage device; and a reinforcing member including a pair of reinforcing walls disposed so as to sandwich two wall portions of the outer case from an outside of the outer case, the two wall portions opposedly facing each other, and a connecting portion that connects the pair of reinforcing walls to each other, wherein rigidity of each of the pair of reinforcing walls is higher than rigidity of the connecting portion.

An energy storage apparatus according to another aspect of the present invention includes: an outer case that accommodates an energy storage device; and a reinforcing member including a pair of reinforcing walls disposed so as to sandwich two wall portions of the outer case from an outside of the outer case, the two wall portions opposedly facing each other, and a connecting portion that connects the pair of reinforcing walls to each other, wherein the reinforcing member includes a first reinforcing member and a second reinforcing member, each of the first reinforcing member and the second reinforcing member includes two plate-shaped portions disposed opposite to each other and the connecting portion connecting the two plate-shaped portions to each other, and each of the pair of reinforcing walls is formed by making one of the two plate-shaped portions of the first reinforcing member and one of the two plate-shaped portions of the second reinforcing member overlap with each other.

An energy storage apparatus according to another aspect of the present invention includes: an outer case that accommodates an energy storage device; and a reinforcing member including a pair of reinforcing walls disposed so as to sandwich two wall portions of the outer case from an outside of the outer case, the two wall portions opposedly facing each other, and a connecting portion that connects the pair of reinforcing walls to each other, wherein a thickness of each of the pair of reinforcing walls is larger than a thickness of the connecting portion.

Advantages of the Invention

According to the present invention, it is possible to provide an energy storage apparatus where the safety of the energy storage apparatus is enhanced.

MODE FOR CARRYING OUT THE INVENTION

Figure 1:
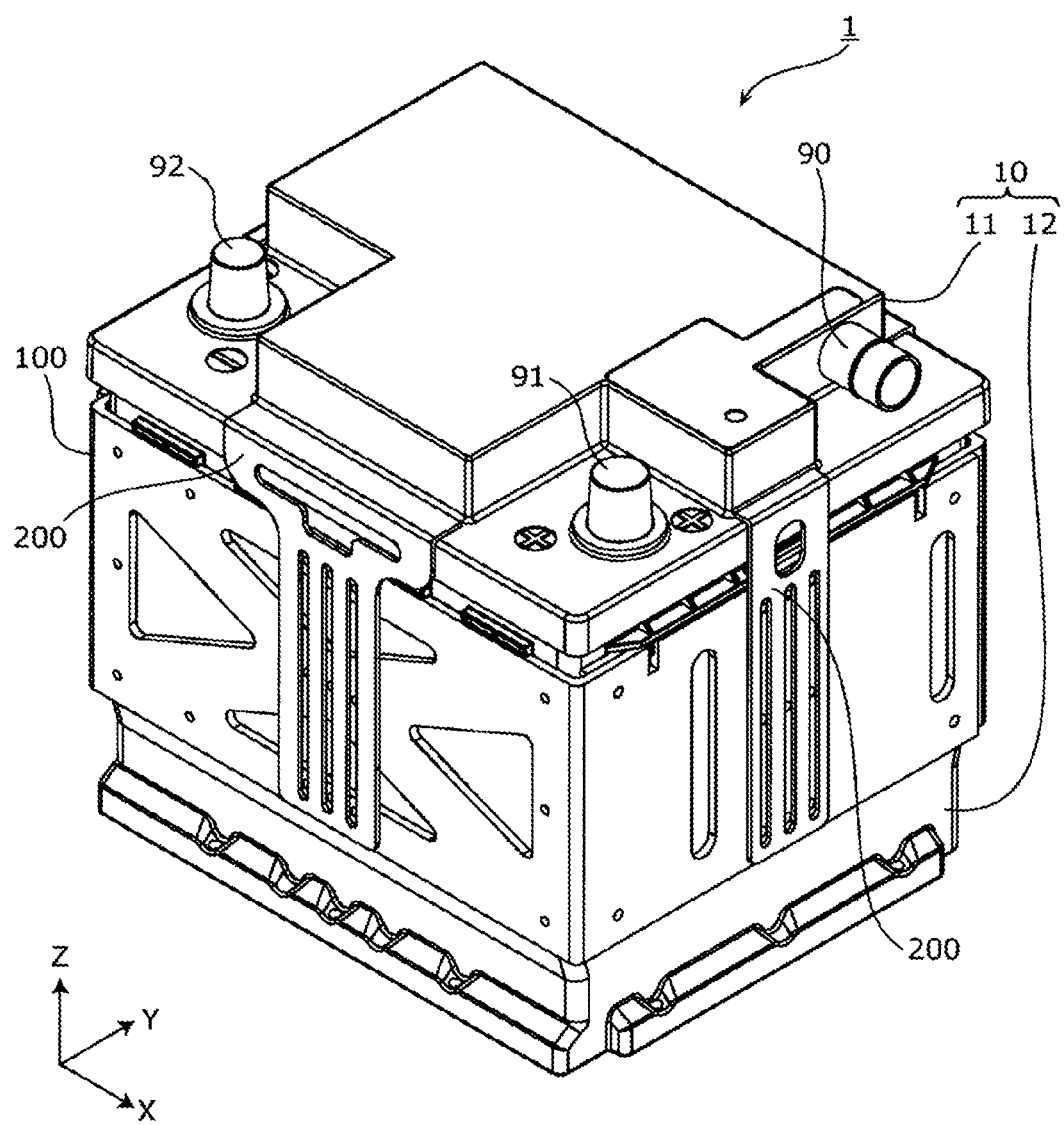
FIG. 1 is a perspective view illustrating an external appearance of an energy storage apparatus according to an embodiment.

An energy storage apparatus according to an aspect of the present invention includes: an outer case that accommodates an energy storage device; and a reinforcing member including a pair of reinforcing walls disposed so as to sandwich two wall portions of the outer case from an outside of the outer case, the two wall portions opposedly facing each other, and a connecting portion that connects the pair of reinforcing walls to each other, wherein rigidity of each of the pair of reinforcing walls is higher than rigidity of the connecting portion.

According to this configuration, the pair of reinforcing walls is connected to each other so as to restrict the movement of the pair of reinforcing walls to the outside. Accordingly, when a wall portion of the outer case receives an external force from the inside, the expansion of the wall portion to the outside is suppressed. As a result, the occurrence of a drawback such as a damage on the outer case is suppressed. Such an advantageous effect can be obtained by the reinforcing member that is mounted on the outer case from the outside and hence, the advantageous effect described above can be acquired without changing the designing of the outer case. Furthermore, the reinforcing wall has relatively high rigidity and hence, the expansion of the wall portion of the outer case can be more reliably suppressed. Further, with respect to the connecting portion where a demand for high rigidity is not so high compared to the reinforcing wall, a thickness of the connecting portion can be reduced or the connecting portion can be made thin. That is, it is possible to effectively suppress deformation of the outer case (the expansion or bulging of the wall portion) while realizing the reduction of weight, downsizing or the like of the reinforcing member. As described above, according to the energy storage apparatus of this aspect, the safety of the energy storage apparatus can be enhanced.

The pair of reinforcing walls may be connected by the connecting portion disposed on each of both sides in a width direction that intersects with an opposedly facing direction of the two wall portions.

According to this configuration, the pair of reinforcing walls is connected to each other on both sides in the width direction and hence, the pair of reinforcing walls can exert a high restraint force on the outer case. Accordingly, an effect of suppressing the expansion of the outer case is increased, and this contributes to enhancement of safety of the energy storage apparatus.

The energy storage device includes a case that includes a pair of long-side surfaces opposedly facing each other, and a plurality of the energy storage devices that are arranged side by side such that the pair of long-side surfaces faces the opposedly facing direction of the two wall portions may be accommodated in the outer case.

In a case where a plurality of energy storage devices are accommodated in the outer case in a state where the plurality of energy storage devices are arranged side by side, when the energy storage devices each have a prismatic shape, in general, the energy storage devices are arranged such that long-side surfaces of the energy storage devices face the arrangement direction of the energy storage devices. The long-side surfaces of the prismatic energy storage device are likely to expand and hence, an array of the energy storage devices formed of the plurality of energy storage devices is likely to expand in the arrangement direction of the plurality of energy storage devices. Accordingly, it is safe to say that the two opposing wall portions are likely to expand outward by receiving an expanding force applied to two wall portions. In this regard, in the energy storage apparatus of this aspect, the reinforcing member is disposed in a posture suitable for restraining the two wall portions and hence, the expansion of the outer case can be effectively suppressed. That is, the reinforcing member is disposed so as to press the portion of the outer case which is likely to expand and hence, the safety of the energy storage apparatus is enhanced.

The reinforcing member includes a first reinforcing member and a second reinforcing member, each of the first reinforcing member and the second reinforcing member includes two plate-shaped portions disposed opposite to each other and the connecting portion connecting the two plate-shaped portions to each other, and each of the pair of reinforcing walls may be formed by making one of the two plate-shaped portions of the first reinforcing member and one of the two plate-shaped portions of the second reinforcing member overlap with each other.

According to this configuration, the reinforcing member can be configured by combining two members (first and second reinforcing members) having the same shape with each other. Accordingly, it is possible to obtain a reinforcing wall having high rigidity that is formed of two plate-shaped portions. By combining the two members such that the connecting portions of the two members face each other, it is also possible to obtain a reinforcing member which can suppress expansion of the outer case in a well-balanced manner. Accordingly, it is possible to obtain a reinforcing member which efficiently suppresses the expansion of the outer case with a simple configuration, and this contributes to the enhancement of the safety of the energy storage apparatus.

An energy storage apparatus according to another aspect of the present invention includes: an outer case that accommodates an energy storage device; and a reinforcing member including a pair of reinforcing walls disposed so as to sandwich two wall portions of the outer case from an outside of the outer case, the two wall portions opposedly facing each other, and a connecting portion that connects the pair of reinforcing walls to each other, wherein the reinforcing member includes a first reinforcing member and a second reinforcing member, each of the first reinforcing member and the second reinforcing member includes two plate-shaped portions disposed opposite to each other and the connecting portion connecting the two plate-shaped portions to each other, and each of the pair of reinforcing walls is formed by making one of the two plate-shaped portions of the first reinforcing member and one of the two plate-shaped portions of the second reinforcing member overlap with each other.

According to this configuration, the pair of reinforcing walls is connected to each other so as to restrict the movement of the pair of reinforcing walls to the outside and hence, the expansion of the wall portion of the outer case to the outside is suppressed. As a result, the occurrence of a damage or the like on the outer case is suppressed. The reinforcing member can be configured by combining two members (first and second reinforcing members) having the same shape with each other. Accordingly, it is possible to obtain a reinforcing wall having high rigidity that is formed of two plate-shaped portions. By combining the two members such that the connecting portions of the two members face each other, it is also possible to obtain a reinforcing member which can suppress expansion of the outer case in a well-balanced manner. Accordingly, it is possible to obtain a reinforcing member which efficiently suppresses the expansion of the outer case with a simple configuration. As described above, according to the energy storage apparatus of this aspect, the safety of the energy storage apparatus can be enhanced.

An energy storage apparatus according to another aspect of the present invention includes: an outer case that accommodates an energy storage device; and a reinforcing member including a pair of reinforcing walls disposed so as to sandwich two wall portions of the outer case from an outside of the outer case, the two wall portions opposedly facing each other, and a connecting portion that connects the pair of reinforcing walls to each other, wherein a thickness of each of the pair of reinforcing walls is larger than a thickness of the connecting portion.

According to this configuration, the pair of reinforcing walls is connected to each other so as to restrict the movement of the pair of reinforcing walls to the outside. Accordingly, when a wall portion of the outer case receives an external force from the inside, the expansion of the wall portion to the outside is suppressed. As a result, the occurrence of a drawback such as a damage on the outer case is suppressed. Such an advantageous effect can be obtained by the reinforcing member that is mounted on the outer case from the outside and hence, the advantageous effect described above can be acquired without changing the designing of the outer case. Further, the reinforcing wall has relatively large thickness and hence, the expansion of the wall portion of the outer case can be more reliably suppressed. Further, with respect to the connecting portion where a demand for large thickness is not so high compared to the reinforcing wall, the connecting portion can be formed with a relatively thin wall thickness. That is, it is possible to effectively suppress deformation of the outer case (the expansion or bulging of the wall portion) while realizing the reduction of weight, downsizing or the like of the reinforcing member. As described above, according to the energy storage apparatus of this aspect, the safety of the energy storage apparatus can be enhanced.

Hereinafter, the energy storage apparatus according to the embodiment (including modifications of the embodiment) of the present invention is described with reference to the drawings. All embodiments described hereinafter are a comprehensive example or a specific example. In the following embodiment, numerical values, shapes, materials, constituent elements, arrangement positions and connection modes of the constituent elements, and the like are provided as examples, and are not intended to limit the present invention. In the respective drawings, sizes and the like are not strictly illustrated.

In the following description and drawings, an arrangement direction along which a plurality of energy storage devices are arranged, a direction in which a pair of long-side surfaces of a case of an energy storage device are opposite to each other, or a thickness direction of the case is defined as an X-axis direction. A direction along which electrode terminals of one energy storage device are arranged or a direction in which a pair of short-side surfaces of the case of the energy storage device are opposite to each other is defined as a Y-axis direction. An arrangement direction of a body portion and a lid body in an outer case of the energy storage apparatus, an arrangement direction of the energy storage devices and bus bars, or a vertical direction is defined as a Z axis direction. These X-axis direction, Y-axis direction, and Z-axis direction are directions that intersect with each other (orthogonal to each other in the embodiment and the modifications of the embodiment described later). A case is also considered where the Z-axis direction is not the vertical direction depending on a use mode. However, in the description made hereinafter, for the sake of convenience of the description, the description is made by assuming the Z-axis direction as the vertical direction.

In the embodiments described later, in some cases, the expressions indicating the relative directions or the relative postures such as parallel or orthogonal are used. However, these expressions also include a case where constituent elements of the energy storage apparatus do not take such directions or postures in strict meaning of the terms. A state where two directions are parallel to each other means not only a state where these two directions are completely parallel to each other but also a state where these two directions are substantially parallel to each other, that is, a state where these two directions are parallel to each other with slight difference of about a few percent. In the description made hereinafter, an X-axis direction positive side indicates an arrow direction side of the X-axis, and an X-axis direction negative side indicates a side opposite to the X-axis direction positive side. The same goes for the Y-axis direction and the Z-axis direction.

EMBODIMENT

[1. Description of Overall Configuration of Energy Storage Apparatus]

Figure 2:
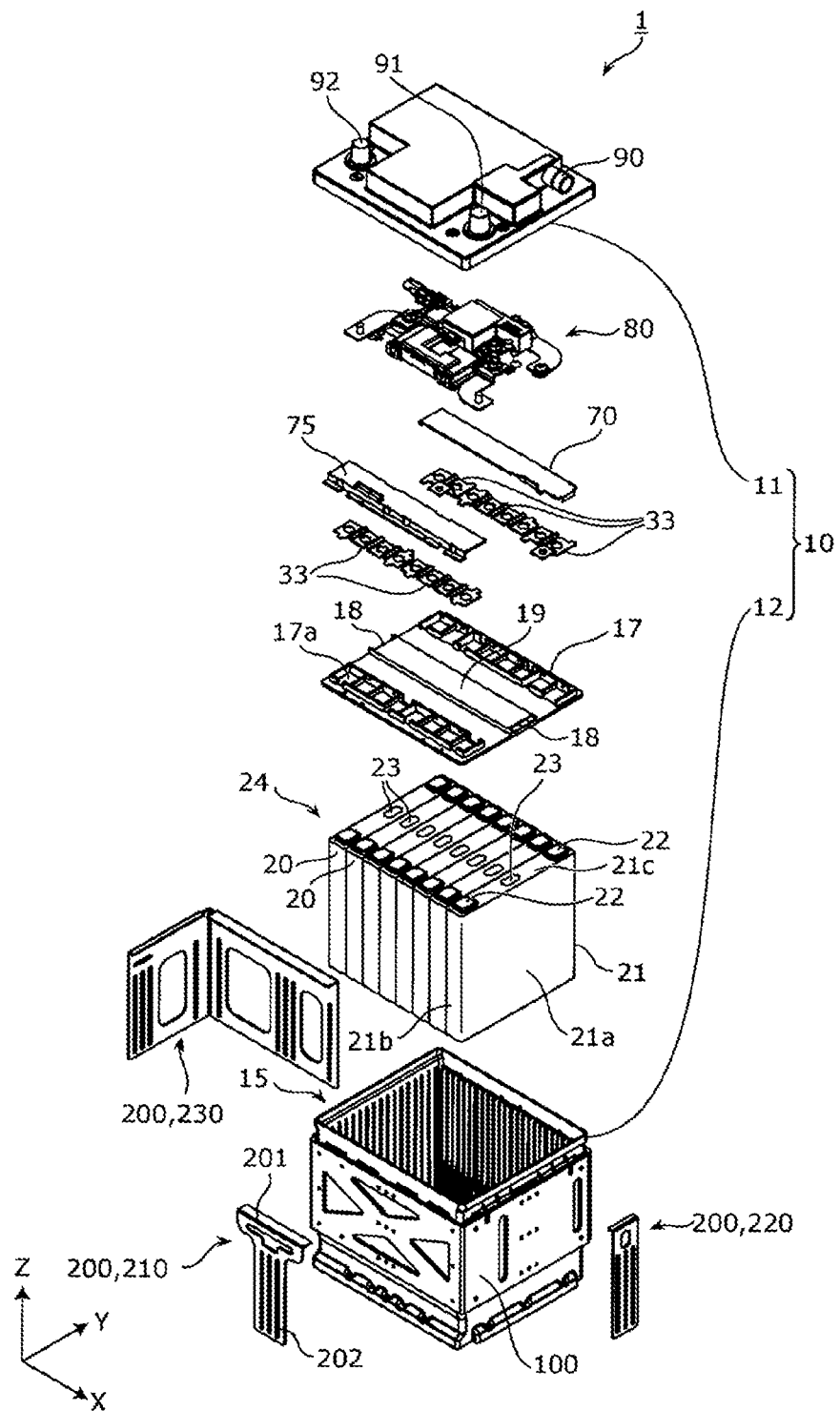
FIG. 2 is an exploded perspective view of an energy storage apparatus according to the embodiment.

First, the overall configuration of an energy storage apparatus 1 according to the embodiment will be described with reference to FIG. 1 and FIG. 2. FIG. 1 is a perspective view illustrating an external appearance of the energy storage apparatus 1 according to the embodiment. FIG. 2 is an exploded perspective view of the energy storage apparatus 1 according to the embodiment.

The energy storage apparatus 1 is an apparatus into which electricity can be charged from the outside and from which electricity can be discharged to the outside. In this embodiment, the energy storage apparatus 1 has an approximately rectangular parallelepiped shape. The energy storage apparatus 1 may be a battery module (assembled battery) used in an electricity storage application, a power source application, or the like. To be more specific, the energy storage apparatus 1 may be used as a battery or the like for driving a mobile body such as an automobile, a motorcycle, a watercraft, a ship, a snowmobile, an agriculture machine, a construction machine, or a railway vehicle for an electric railway, or may be used as a battery for starting an engine of the mobile body. As the above-described automobile, an electric vehicle (EV), a hybrid electric vehicle (HEV), a plug-in hybrid electric vehicle (PHEV), and a gasoline automobile are exemplified. As the above-described railway vehicle for an electric railway, an electric train, a monorail, and a linear motor car are exemplified. The energy storage apparatus 1 can also be used as a stationary battery or the like used as a home-use battery, a generator, or the like.

As illustrated in FIG. 1 and FIG. 2, the energy storage apparatus 1 includes a plurality of energy storage devices 20, an outer case 10 that accommodates the plurality of energy storage devices 20, and a reinforcing member 100 mounted on the outer case 10. In this embodiment, eight energy storage devices 20 are accommodated in the outer case 10. The number of energy storage devices 20 included in the energy storage apparatus 1 is not limited to 8. It is sufficient for the energy storage apparatus 1 to include one or more energy storage devices 20. In this embodiment, one energy storage device array 24 is formed of the plurality of energy storage devices 20 arranged side by side in the X axis direction. The energy storage device array 24 may include a spacer, an insulating film, and the like not illustrated in the drawings.

The outer case 10 includes a body portion 12 which accommodates the energy storage device array 24 and a lid body 11, and a bus bar plate 17 is disposed between the energy storage device array 24 accommodated in the body portion 12 and the lid body 11. A plurality of bus bars 33 are held on the bus bar plate 17, and the plurality of bus bars 33 are covered with bus bar covers 70 and 75. A connection unit 80 including a control circuit and the like is disposed between the bus bar plate 17 and the lid body 11.

The outer case 10 is a case (module case) having a rectangular shape (box shape) that forms an outer profile of the energy storage apparatus 1. That is, the outer case 10 is a member that fixes the energy storage device array 24, the bus bar plate 17, and the like at predetermined positions, and protects these constitutional elements from an impact or the like. For example, the outer case 10 is made of an insulating member such as polycarbonate (PC), polypropylene (PP), polyethylene (PE), polystyrene (PS), a polyphenylene sulfide resin (PPS), polyphenylene ether (PPE (including modified PPE)), polyethylene terephthalate (PET), polybutylene terephthalate (PBT), polyether ether ketone (PEEK), tetrafluoroethylene/perfluoroalkyl vinyl ether (PFA), polytetrafluoroethylene (PTFE), polyether sulfone (PES), an ABS resin, or a composite material of the above-mentioned materials, or metal to which insulation coating is applied.

The lid body 11 included in the outer case 10 is a rectangular member which closes an opening portion 15 of the body portion 12, and includes an external terminal 91 on a positive electrode side and an external terminal 92 on a negative electrode side. The external terminals 91 and 92 are electrically connected to the plurality of energy storage devices 20 via the connection unit 80 and the bus bars 33. The energy storage apparatus 1 charges electricity from the outside and discharges electricity to the outside via the external terminals 91, 92. The external terminals 91, 92 are respectively formed of a conductive member made of metal such as aluminum, or an aluminum alloy.

The lid body 11 is provided with a ventilation chamber (not illustrated in the drawing) through which gas moving from one of the inside and the outside of the outer case 10 to the other passes, and an exhaust tube 90 that communicates the inside of the ventilation chamber with the outside of the outer case 10. The gas inside the outer case 10 is discharged to the outside of the outer case 10 through the ventilation chamber and the exhaust tube 90. More specifically, in the ventilation chamber, a valve member that is opened when a pressure (internal pressure) inside the outer case 10 increases to a predetermined value is disposed. Accordingly, in a normal state, even when foreign matter such as water or dust flows into the ventilation chamber through the exhaust tube 90, the inflow of the foreign matter into the inside of the outer case 10 is substantially prevented by the valve member. When the gas is discharged from the energy storage device 20 and the internal pressure of the outer case 10 becomes equal to or higher than the predetermined value, the valve member is brought into an open state, and the gas inside the outer case 10 is discharged from the exhaust tube 90 to the outside of the outer case 10 through the ventilation chamber.

The body portion 12 of the outer case 10 is a bottomed rectangular cylindrical housing (housing) in which the opening portion 15 for accommodating the energy storage device array 24 is formed. In a state where the opening portion 15 is closed by the lid body 11, a peripheral edge of the opening portion 15 and the lid body 11 are joined to each other by thermal welding. Accordingly, airtightness in the opening portion 15 is secured.

The energy storage device 20 is a secondary battery (battery cell) that can charge electricity and discharge electricity. More specifically, the energy storage device 20 is a nonaqueous electrolyte secondary battery such as a lithium ion secondary battery. The energy storage device 20 has a flat rectangular parallelepiped shape (prismatic shape). In this embodiment, eight pieces of energy storage devices 20 are arranged side by side in the X-axis direction as described above.

In this embodiment, the energy storage device 20 includes the case 21 made of metal. The case 21 is a prismatic case having a pair of long-side surfaces 21a facing each other and a pair of short-side surfaces 21b facing each other. An electrode assembly, a current collector, an electrolyte solution, and the like are accommodated in the case 21. In this embodiment, the plurality of energy storage devices 20 are arranged in a row in the X axis direction in a posture where the long-side surfaces 21a are directed in the X axis direction (a posture where the short-side surfaces 21b are parallel to the X axis direction).

Electrode terminals 22 (a positive electrode terminal and a negative electrode terminal) made of metal and electrically connected to the electrode assembly in the inside of the case 21 are provided on the lid plate 21c of the case 21. The lid plate 21c of the case 21 is further provided with a gas release valve 23 for releasing the gas inside the case 21 to the outside. The gas release valve 23 has a function of releasing the gas inside the case 21 to the outside of the case 21 by releasing an internal pressure (by opening the valve) when the internal pressure of the case 21 increases due to vaporization of the electrolyte solution inside the case 21. The gas release valve 23 having such a function is provided to each of the plurality of energy storage devices 20. In this embodiment, as illustrated in FIG. 2, each of the plurality of energy storage devices 20 is arranged in a posture where the gas release valve 23 faces the Z-axis direction positive side.

The energy storage device 20 is not limited to a nonaqueous electrolyte secondary battery. The energy storage device 20 may be a secondary battery other than the non-aqueous electrolyte secondary battery, or may be a capacitor. The energy storage device 20 may be a primary battery that allows a user to use stored electricity even when the user does not charge the energy storage device 20. In this embodiment, the energy storage device 20 having the rectangular parallelepiped shape (prismatic shape) is illustrated. However, the shape of the energy storage device 20 is not limited to the rectangular parallelepiped shape. The energy storage device 20 may have a polygonal columnar shape other than the rectangular parallelepiped shape, a circular columnar shape, an elliptical columnar shape, or the like. Further, a laminate-type energy storage device may be provided to the energy storage apparatus 1 as the energy storage device 20.

The bus bar 33 is a rectangular plate-like member which is disposed on at least two energy storage devices 20 in a state where the bus bar 33 is held by the bus bar plate 17, and the bus bar 33 electrically connects the electrode terminals 22 of at least these two energy storage devices 20 to each other. A material for forming the bus bar 33 is not particularly limited, and the bus bar 33 may be formed of metal such as aluminum, an aluminum alloy, copper, a copper alloy, or stainless steel or a combination thereof, or a conductive member other than metal. In the embodiment, using five bus bars 33, four sets of energy storage device groups are formed where two energy storage devices 20 are connected with each other in parallel in each energy storage device group. Then, four sets of energy storage device groups are connected in series. The mode of electrical connection of the eight energy storage devices 20 is not particularly limited, and all of the eight energy storage devices 20 may be connected in series by seven bus bars.

The connection unit 80 is a unit that includes a plurality of bus bars, a control board, and the like, and electrically connects the energy storage device array 24 and the external terminals 91 and 92 to each other. The control board that the connection unit 80 includes has a plurality of electric components. Using this plurality of electric components, a detection circuit that detects a state of each energy storage device 20, a control circuit that controls charging and discharging of the energy storage devices 20, and the like are formed. In this embodiment, the connection unit 80 is fixed to the bus bar plate 17.

The bus bar plate 17 is a resin-made member that holds the bus bars 33. In this embodiment, the bus bar plate 17 is a member that holds the plurality of bus bars 33, the connection unit 80, and other wirings and the like (not illustrated in the drawing), and can perform positional restriction and the like of these members. A plurality of bus bar opening portions 17a are formed in the bus bar plate 17. The plurality of bus bar opening portions 17a are provided for respectively holding the plurality of bus bars 33. Apart of each of the plurality of bus bars 33 is exposed to a side where the plurality of energy storage devices 20 are disposed through the corresponding bus bar opening portion 17a.

In the middle of the bus bar plate 17 in the Y axis direction, a path forming portion 19 extending in the X axis direction and protruding toward the Z axis direction positive side is provided along the arrangement of the gas release valves 23 of the plurality of energy storage devices 20. The path forming portion 19 covers all of the gas release valves 23 from the Z-axis direction positive side. As illustrated in FIG. 2, a path outlet 18 is provided at end portions of the path forming portion 19 in a longitudinal direction of the path forming portion 19, on both sides of an X-axis direction positive side and an X-axis direction negative side. Accordingly, the gas released from the energy storage device 20 mainly passes through the path outlet 18 and is discharged to the outside of the outer case 10 through the above-mentioned ventilation chamber and the above-mentioned exhaust tube 90. The bus bar plate 17 configured as described above is fixed to the body portion 12 of the outer case 10 by a predetermined method such as adhesion or thermal welding.

Each of the bus bar covers 70 and 75 is a resin-made member covering the plurality of bus bars 33 from above, and plays a role of electrically insulating the plurality of bus bars 33 and the connection unit 80 from each other.

The reinforcing member 100 is a member which reinforces the outer case 10. In the present embodiment, the reinforcing member 100 is disposed so as to surround the outer case 10, and when the outer case 10 intends to expand due to an increase of an internal pressure, the expansion can be suppressed by the reinforcing member 100. As illustrated in FIG. 1 and FIG. 2, a plurality of restricting members 200 are fixed to the reinforcing member 100 according to the present embodiment, and these restricting members 200 mainly have a function of pressing the lid body 11. Each of the plurality of restricting members 200 is fixed to the reinforcing member 100 by welding or fastening with a bolt or a rivet. In the present embodiment, three restricting members 200 are fixed to the reinforcing member 100, and in order to distinguish these three restricting members 200, reference signs (210, 220, 230) different from each other are given to the three restricting members 200 as illustrated in FIG. 2. In the description made hereinafter, the matter described for the "restricting member 200" is applied to each of the restricting members 210, 220, and 230. Hereinafter, the configuration of the reinforcing member 100 and the periphery thereof will be further described with reference to FIG. 3 to FIG. 6.

[2. Configuration of Reinforcing Member and Periphery Thereof]

Figure 3:
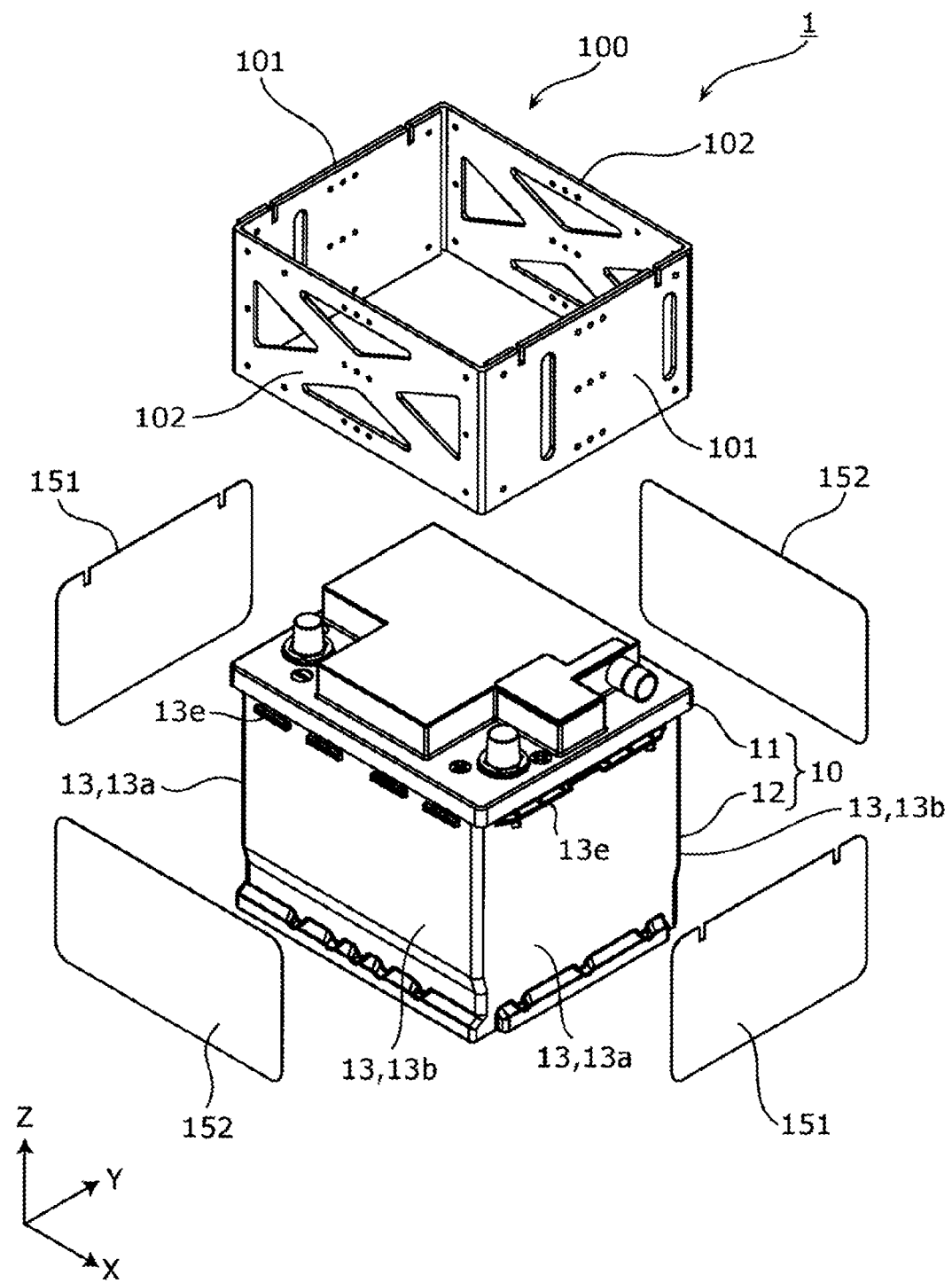
FIG. 3 is a perspective view illustrating the configuration of a reinforcing member and the periphery thereof according to the embodiment.
Figure 4:
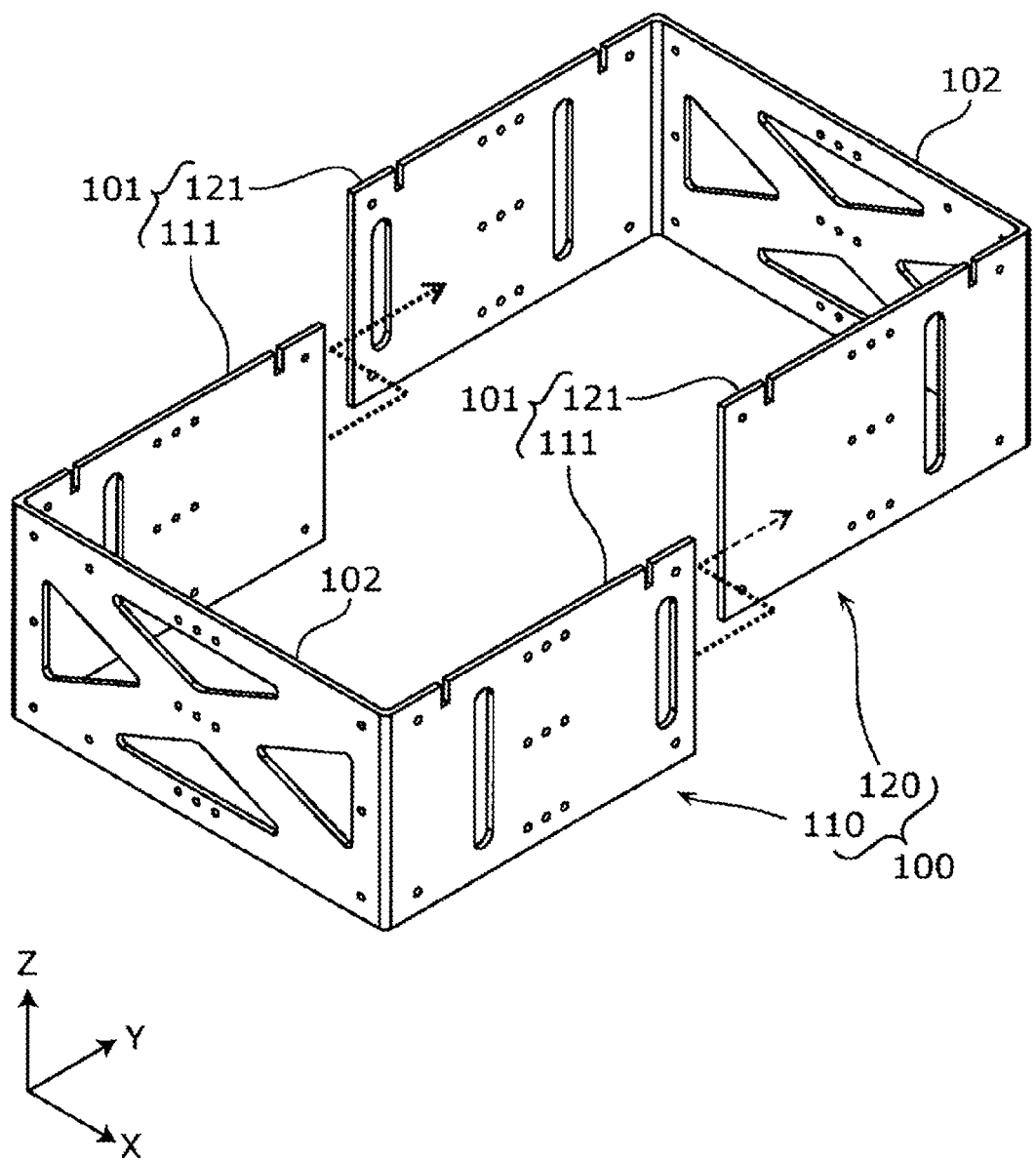
FIG. 4 is an exploded perspective view of the reinforcing member according to the embodiment.
Figure 5:
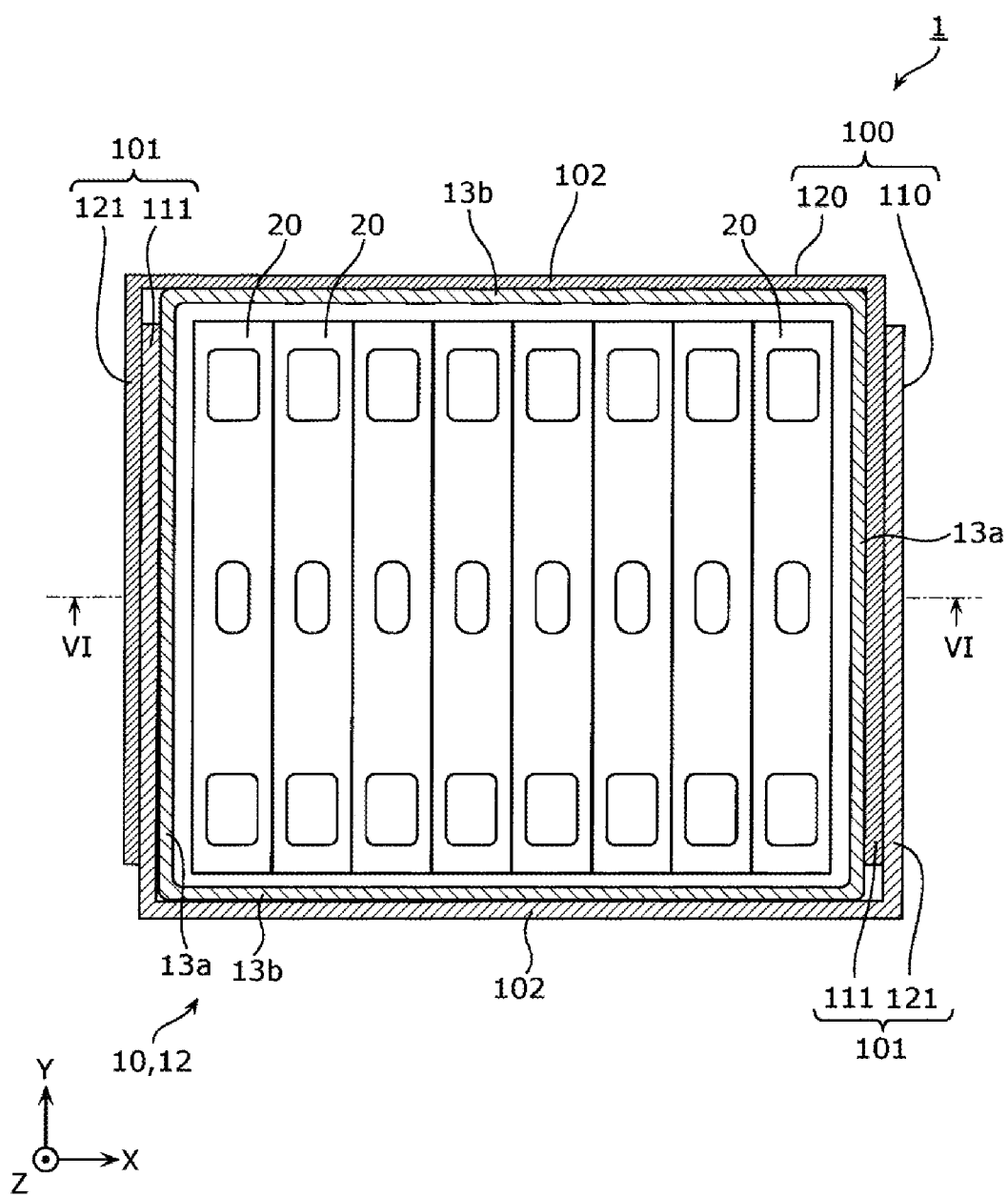
FIG. 5 is a first cross-sectional view illustrating a structural relationship between the reinforcing member and an outer case according to the embodiment.
Figure 6:
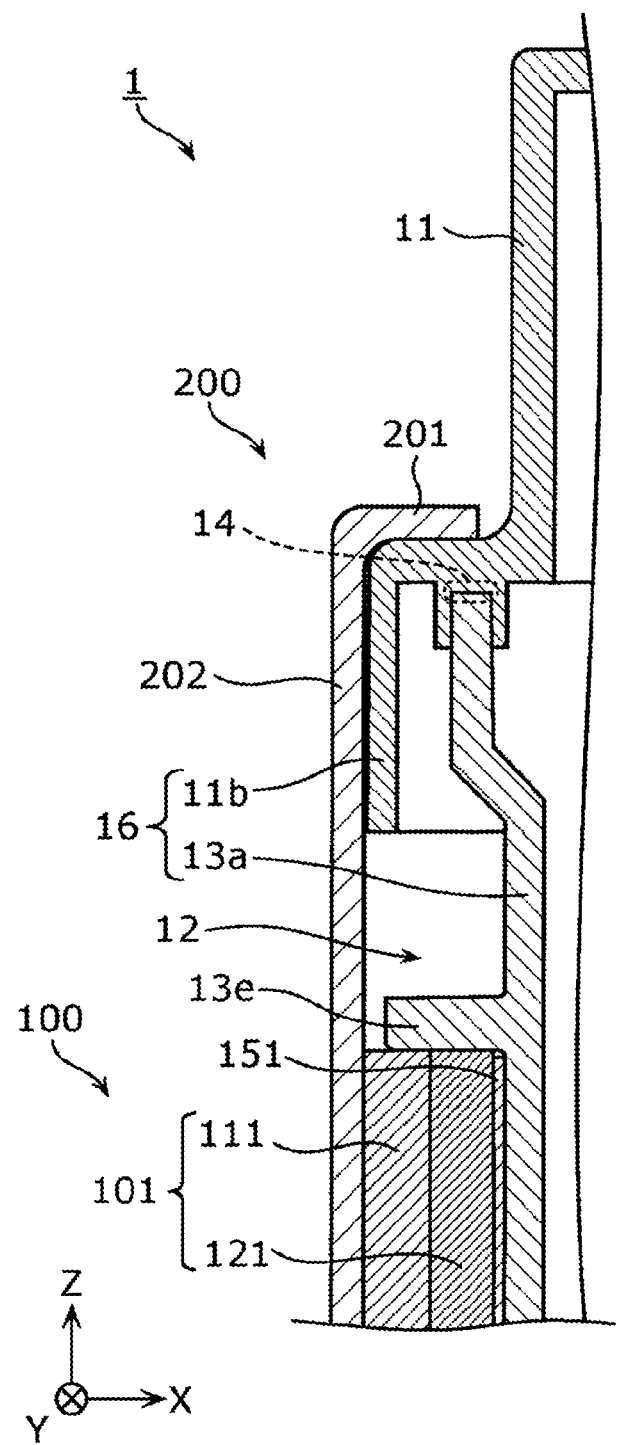
FIG. 6 is a second cross-sectional view illustrating a structural relationship between the reinforcing member and the outer case according to the embodiment.

FIG. 3 is a perspective view illustrating the configuration of the reinforcing member 100 and the periphery thereof according to the embodiment. FIG. 3 illustrates a state where the reinforcing member 100 and spacers 151 and 152 are separated from the outer case 10. FIG. 4 is an exploded perspective view of the reinforcing member 100 according to the embodiment. FIG. 5 is a first cross-sectional view illustrating a structural relationship between the reinforcing member 100 and the outer case 10 according to the embodiment. In FIG. 5, a transverse cross section (a cross section parallel to an XY plane) at a middle portion in the vertical direction (Z-axis direction) of the energy storage apparatus 1 is simply illustrated, and each energy storage device 20 is illustrated not in a cross-sectional view but in a plan view. The illustration of the restricting member 200 and the spacers 151 and 152 is omitted. FIG. 6 is a second cross-sectional view illustrating a structural relationship between the reinforcing member 100 and the outer case 10 according to the embodiment. FIG. 6 illustrates an end portion on an X-axis direction negative side in a VI-VI cross section in FIG. 5.

As illustrated in FIG. 3, the reinforcing member 100 is an annular member as viewed in a plan view (when viewed from a Z-axis direction positive side) and is formed along four wall portions 13 of the outer case 10. Specifically, the reinforcing member 100 includes a pair of reinforcing walls 101 disposed so as to sandwich the two wall portions 13 facing each other from the outside, and a connecting portion 102 connecting the pair of reinforcing walls 101 to each other. In the present embodiment, as illustrated in FIG. 3, the four wall portions 13 that the outer case 10 includes are distinguished into a pair of wall portions 13a forming the short-side surfaces of the outer case 10 and a pair of wall portions 13b forming the long-side surfaces of the outer case 10. In this case, it can be expressed that the pair of reinforcing walls 101 is disposed so as to sandwich two wall portions 13a facing each other from the outside.

The reinforcing member 100 is a member made of metal such as iron or an aluminum alloy, and as illustrated in FIG. 3, is fixed to the outer case 10 in a state where the spacers 151 and 152 are interposed between the reinforcing member 100 and the outer case 10. The spacers 151 and 152 are members made of mica or a resin, and are members which protect the outer case 10 from the reinforcing member 100 having higher rigidity than the outer case 10 and electrically insulate the outer case 10 and the reinforcing member 100 from each other. As such a member, a mica molded article, or a resin having an electrical insulation property such as PP, PC, or PE is adopted in the same manner as the outer case 10. The material for forming the spacers 151 and 152 such as a resin may contain a material for improving strength, durability, heat resistance, or the like, such as glass fiber.

In the present embodiment, as illustrated in FIG. 4 and FIG. 5, the reinforcing member 100 is configured by combining a first reinforcing member 110 and a second reinforcing member 120. Specifically, each of the two reinforcing walls 101 of the reinforcing member 100 is configured by overlapping a plate-shaped portion 111 of the first reinforcing member 110 and a plate-shaped portion 121 of the second reinforcing member 120. One of the two connecting portions 102 of the reinforcing member 100 is a portion connecting the two plate-shaped portions 111 of the first reinforcing member 110, and the other is a portion connecting the two plate-shaped portions 111 of the second reinforcing member 120. In this manner, the reinforcing member 100 formed of the first reinforcing member 110 and the second reinforcing member 120 is fixed to the outer case 10 by the following procedure.

First, the first reinforcing member 110 and the second reinforcing member 120 are disposed at positions illustrated in FIG. 5 with respect to the outer case 10. Thereafter, the first reinforcing member 110 and the second reinforcing member 120 are pressurized from both sides in the Y axis direction, and the plate-shaped portion 111 and the plate-shaped portion 121 overlapped with each other in the X axis direction are joined to each other by spot welding or the like while maintaining such a pressed state. Accordingly, the outer case 10 is brought into a state where the outer case 10 is appropriately fastened by the reinforcing member 100, and the reinforcing member 100 is brought into a state where the reinforcing member 100 is substantially fixed to the outer case 10.

Such an attachment operation of the reinforcing member 100 is performed in a state where the energy storage device array 24, the connection unit 80 and the like are accommodated in the outer case 10 and the lid body 11 is joined to the opening portion 15 of the body portion 12. At the time of attachment operation of the reinforcing member 100, positions of the first reinforcing member 110 and the second reinforcing member 120 in the vertical direction (Z-axis direction) can be positioned by ribs 13e (see FIG. 3 and FIG. 6) provided on an outer surface of the wall portion 13 of the body portion 12. A method of joining the plate-shaped portion 111 and the plate-shaped portion 121 is not limited to welding, and fastening using a bolt or a rivet may be adopted as the joining method.

As described above, in the reinforcing member 100 according to the present embodiment, each of the pair of reinforcing walls 101 disposed opposite to each other is configured by overlapping and joining the plate-shaped portions 111 and 121. Accordingly, the rigidity of the reinforcing wall 101 is higher than that of the connecting portion 102 that is a single plate-shaped portion. From the viewpoint of thickness, a thickness of the reinforcing wall 101 is larger than a thickness of the connecting portion 102. With such a configuration, it is possible to enhance effectiveness of a function of suppressing an expansion of the outer case 10 realized by the reinforcing walls 101 while exerting a restraining function by the connecting portion 102 with respect to the two reinforcing walls 101.

As described above, the energy storage apparatus 1 according to the present embodiment includes the outer case 10 that accommodates the energy storage devices 20 and the reinforcing member 100. The reinforcing member 100 includes the pair of reinforcing walls 101 disposed so as to sandwich the two wall portions 13 (wall portions 13a) of the outer case 10 facing each other from the outside, and the connecting portion 102 connecting the pair of reinforcing walls 101 to each other. The rigidity of each of the pair of reinforcing walls 101 is higher than the rigidity of the connecting portion 102.

According to this configuration, the pair of reinforcing walls 101 is connected to each other so as to restrict the movement of the pair of reinforcing walls 101 to the outside. With such a configuration, the expansion of the wall portions 13a to the outside, when the wall portions 13a of the outer case 10 receives a force (an internal pressure of the outer case 10 or a pressing force attributed to an expansion of one or more energy storage devices 20) from the inside, can be suppressed. As a result, the occurrence of a drawback such as a damage on the outer case 10 is suppressed. When the valve of the energy storage device 20 in the outer case 10 is opened so that a gas is released from the outer case 10, an internal pressure of the outer case 10 in a gastight state or in a substantially gastight state is rapidly increased. In this case, there may be a case where the release of the gas from the exhaust tube 90 does not catch up with the increase of the internal pressure, and the internal pressure of the outer case 10 increases or the internal pressure is maintained at a high level. In this case, it is conceivable that a damage such as cracking occurs in the resin-made outer case 10, and the gas leaks out from the damaged portion. That is, there is a possibility that the gas leaks from an unexpected place of the outer case 10, and that may cause a problem on safety. However, in the energy storage apparatus 1 according to this embodiment, the expansion of the outer case 10 is suppressed by the reinforcing member 100 fixed to the outer case 10 and hence, a possibility that a damage such as cracking occurs in the outer case 10 is reduced. Such an advantageous effect can be obtained by the reinforcing member 100 that is attached to the outer case 10 from the outside and hence, the above-mentioned advantageous effect can be obtained without changing the designing of the outer case 10.

Further, the reinforcing wall 101 has the relatively high rigidity and hence, the expansion of the wall portion 13 of the outer case 10 can be more reliably suppressed. Further, with respect to the connecting member 102 where a demand for high rigidity is not so high compared to the reinforcing wall 101, a thickness of the connecting member 102 can be reduced or the connecting member 102 is thinned. As illustrated in FIG. 3, the connecting member 102 may be light-weighted by forming four thinned portions (opening portions). That is, in the energy storage apparatus 1 of this embodiment, it is possible to effectively suppress the deformation of the outer case 10 (the expansion of the wall portion 13) while realizing the reduction of weight, downsizing or the like of the reinforcing member 100. As described above, according to the energy storage apparatus 1 of the present embodiment, the safety of the energy storage apparatus 1 can be enhanced.

The comparison in rigidity between the reinforcing wall 101 and the connecting portion 102 is performed by comparing values in bending rigidity between the reinforcing wall 101 and the connecting portion 102. The bending rigidity of the reinforcing wall 101 means a bending rigidity in an arrangement direction (X axis direction) of the reinforcing wall 101 and the outer case 10. The bending rigidity of the connecting portion 102 means a bending rigidity in an arrangement direction (Y axis direction) of the connecting portion 102 and the outer case 10. Specifically, in the reinforcing member 100, the pair of reinforcing walls 101 and the connecting portion 102 are cut at the connecting portion, and the pair of reinforcing walls 101 and the connecting portion 102 are separated from each other. Thereafter, the bending rigidity of the pair of reinforcing walls 101 and the bending rigidity of the connecting portion 102 are measured, and measured bending rigidity values are compared with each other. As described in the present embodiment, such a difference in rigidity may be realized by the difference in cross-sectional shape (cross-sectional secondary moment) between the reinforcing wall 101 and the connecting portion 102, the difference in material between the reinforcing wall 101 and the connecting portion 102, or the like, besides the difference in thickness between the reinforcing wall 101 and the connecting portion 102.

In the present embodiment, the pair of reinforcing walls 101 are connected to each other by the connecting portion 102 disposed on both sides in a width direction (Y-axis direction) that intersects with an opposedly facing direction of the two wall portions 13.

As described above, in the present embodiment, the pair of reinforcing walls 101 is brought into a posture parallel to the YZ plane respectively and is connected to each other on both sides in the Y axis direction and hence, the pair of reinforcing walls 101 can exert a high restraining force with respect to the outer case 10. With such a configuration, an effect of suppressing the expansion of the outer case 10 is enhanced, and this contributes to the enhancement of the safety of the energy storage apparatus 1.

In the present embodiment, as illustrated in FIG. 2, the plurality of energy storage devices 20 arranged side by side in an opposedly facing direction of the two wall portions 13 (wall portions 13a) are accommodated in the outer case 10.

To be more specific, in the outer case 10, each of the plurality of energy storage devices 20 is a prismatic energy storage device 20, and is disposed such that the long-side surfaces 21a (see FIG. 2) are directed in the arrangement direction of the energy storage devices 20. In the prismatic energy storage device 20, the long-side surfaces 21a are likely to expand and hence, the energy storage device array 24 formed of the plurality of energy storage devices 20 is likely to expand in the arrangement direction of the plurality of energy storage devices 20. Accordingly, it can be said that the two opposedly facing wall portions 13a are likely to expand outward by receiving the expansion of the energy storage device array 24. In this regard, in the energy storage apparatus 1 of the present embodiment, the reinforcing member 100 is disposed in a posture suitable for restraining the two wall portions 13a and hence, the expansion of the outer case 10 can be effectively suppressed. That is, the reinforcing member 100 is disposed so as to press the portion of the outer case 10 that is likely to expand. With such a configuration, the safety of the energy storage apparatus 1 is enhanced.

In the present embodiment, the reinforcing member 100 includes the first reinforcing member 110 and the second reinforcing member 120. Each of the first reinforcing member 110 and the second reinforcing member 120 includes the two plate-shaped portions 111 or 121 disposed opposite to each other and the connecting portion 102 connecting the two plate-shaped portions 111 or 121 to each other. Each of the pair of reinforcing walls 101 is configured by overlapping one of the two plate-shaped portions 111 of the first reinforcing member 110 and one of the two plate-shaped portions 121 of the second reinforcing member 120.

According to such a configuration, the reinforcing member 100 can be configured by combining two members (first and second reinforcing members 120) having the same shape with each other. Accordingly, it is possible to obtain a reinforcing wall 101 having high rigidity that is formed of the two plate-shaped portions 111, 121. By combining the two members such that the connecting portions 102 of the two members face each other, it is also possible to obtain the reinforcing member 100 that can suppress the expansion of the outer case 10 in a well-balanced manner. Accordingly, it is possible to obtain the reinforcing member 100 that efficiently suppresses the expansion of the outer case 10 with the simple configuration, and this contributes to the enhancement of the safety of the energy storage apparatus 1.

The configuration of the energy storage apparatus 1 according to the present embodiment can also be described as follows. That is, the energy storage apparatus 1 includes: the outer case 10 that accommodates the energy storage devices 20; and the reinforcing member 100 that includes the pair of reinforcing walls 101 and the connecting portions 102. The pair of reinforcing walls 101 is disposed so as to sandwich the two wall portions 13 (wall portions 13a) of the outer case 10 opposedly facing each other from the outside. The connecting portion 102 connects the pair of reinforcing walls 101 to each other. The reinforcing member 100 includes the first reinforcing member 110 and the second reinforcing member 120, and the first reinforcing member 110 includes the two plate-shaped portions 111 disposed opposite to each other and the connecting portion 102 that connects the two plate-shaped portions 111 to each other. The second reinforcing member 120 includes the two plate-shaped portions 121 disposed opposite to each other and the connecting portion 102 that connects the two plate-shaped portions 121 to each other. Each of the pair of reinforcing walls 101 is configured by overlapping one of the two plate-shaped portions 111 of the first reinforcing member 110 and one of the two plate-shaped portions 121 of the second reinforcing member 120.

According to this configuration, the pair of reinforcing walls 101 is connected to each other so as to restrict the movement of the pair of reinforcing walls 101 to the outside and hence, the expansion of the wall portion 13a of the outer case 10 to the outside is suppressed. As a result, the occurrence of a damage or the like on the outer case 10 is suppressed. The reinforcing member 100 can be configured by combining two members (first and second reinforcing members 120) having the same shape with each other. Accordingly, it is possible to obtain a reinforcing wall 101 having high rigidity that is formed of the two plate-shaped portions 111, 121. By combining the first reinforcing member 110 and the second reinforcing member 120 such that the connecting portions 102 of the first and second reinforcing members 110, 120 face each other, it is also possible to obtain the reinforcing member 100 that can suppress the expansion of the outer case 10 in a well-balanced manner. Accordingly, it is possible to obtain the reinforcing member 100 that efficiently suppresses the expansion of the outer case 10 with a simple configuration. Therefore, according to the energy storage apparatus 1 of the present embodiment, the safety of the energy storage apparatus 1 can be enhanced.

The configuration of the energy storage apparatus 1 according to the present embodiment can also be described as follows. That is, the energy storage apparatus 1 includes the outer case 10 that accommodates the energy storage devices 20 and the reinforcing member 100. The reinforcing member 100 includes the pair of reinforcing walls 101 disposed so as to sandwich the two wall portions 13 (wall portions 13a) of the outer case 10 facing each other from the outside, and the connecting portion 102 connecting the pair of reinforcing walls 101 to each other. The thickness of each of the pair of reinforcing walls 101 is larger than the thickness of the connecting portion 102.

According to this configuration, the pair of reinforcing walls 101 is connected to each other so as to restrict the movement of the pair of reinforcing walls 101 to the outside. Accordingly, when the wall portions 13a of the outer case 10 receive an external force from the inside, the expansion of the wall portions 13a to the outside is suppressed. As a result, the occurrence of a drawback such as a damage on the outer case 10 is suppressed. Such an advantageous effect can be obtained by the reinforcing member 100 that is attached to the outer case 10 from the outside and hence, the above-mentioned advantageous effect can be obtained without changing the designing of the outer case 10. Further, the reinforcing wall 101 has the relatively large thickness and hence, the expansion of the wall portion 13 of the outer case 10 can be more reliably suppressed. Further, with respect to the connecting portion 102 where a demand for large thickness is not so high compared to the reinforcing wall 101, the connecting portion 102 can be formed with a relatively thin wall thickness. That is, it is possible to effectively suppress the deformation of the outer case 10 (the expansion of the wall portion 13) while realizing the reduction of weight, downsizing or the like of the reinforcing member 100. Therefore, according to the energy storage apparatus 1 of the present embodiment, the safety of the energy storage apparatus 1 can be enhanced.

The thickness of the reinforcing wall 101 is a width of the reinforcing wall 101 in the direction in which the pair of reinforcing walls 101 is arranged. The thickness of the reinforcing wall 101 is a width, in the arrangement direction, of main portions excluding protrusions protruding in the arrangement direction, through holes penetrating the reinforcing wall 101 in the arrangement direction, recessed portions recessed in the arrangement direction, and the like. In a case where there exists distribution or unevenness in the thickness of the reinforcing wall 101 as viewed in the direction that the reinforcing wall 101 is arranged, an average value, a most frequent value, or the like of the thickness may be adopted as the thickness of the reinforcing wall 101.

In the present embodiment, the reinforcing wall 101 thicker than the connecting portion 102 is formed by overlapping the plate-shaped portions 111 and 121. However, the reinforcing wall 101 may be formed of a single member. A reinforcing member 100 having a reinforcing wall 101 thicker than a connecting portion 102 may be manufactured by using a metal plate in which a thick portion and a thin portion are formed by press working.

In the present embodiment, more specifically, as shown in FIG. 6, the lid body 11 and the body portion 12 of the outer case 10 are joined to each other at a joint portion 14 positioned at a peripheral edge of the opening portion 15 (see FIG. 2) of the outer case 10. For example, the joint portion 14 that is a portion where the lid body 11 and the main body portion 12 are joined to each other is formed by thermal welding. In this configuration, when an internal pressure of the outer case 10 increases, the internal pressure acts on the wall portion 13a in FIG. 6 in a direction that an upper end of the wall portion 13a falls outward. Accordingly, stress is likely to concentrate on the joint portion 14, and as a result, there is a possibility that a part of the joint portion 14 is damaged so that a gas filled in the inside of the outer case 10 leaks out from the part of the joint portion 14. However, in the energy storage apparatus 1 according to this embodiment, as illustrated in FIG. 6, the reinforcing member 100 having the relatively high rigidity is disposed at a position where the reinforcing member 100 presses the wall portion 13a from the outside. With such a configuration, the deformation of the wall portion 13a to the outside is suppressed. As a result, a damage such as cracking of the joint portion 14, that is a portion where a damage due to deformation of the wall portion 13a to the outside is likely to occur, is suppressed.

Further, in the present embodiment, as illustrated in FIG. 6, the restricting member 200 is disposed outside the reinforcing member 100. The restricting member 200 includes a contact portion 201 that is brought into contact with the upper surface of the lid body 11 and a fixing portion 202 fixed to the reinforcing member 100. The fixing portion 202 is joined to the outer surface of the reinforcing wall 101 of the reinforcing member 100 by welding or the like. Accordingly, the restricting member 200 functions as a member that increases the rigidity of the reinforcing wall 101 or a member that increases the thickness of the reinforcing wall 101. That is, the fixing portion 202 of the restricting member 200 can enhance the reinforcing function by the reinforcing member 100.

The fixing portion 202 of the restricting member 200 further has a portion that is brought into contact with a peripheral wall portion 11b of the lid body 11 from the outside. Accordingly, when the combination of the wall portion 13a that is a part of the body portion 12 and the peripheral wall portion 11b of the lid body 11 is defined as the wall portion 16 of the outer case 10, and the restricting member 200 fixed to the reinforcing member 100 by welding or the like is defined as a part of the reinforcing member 100, the following can be said. The reinforcing member 100 includes the pair of reinforcing walls 101 disposed so as to sandwich the two wall portions 16 of the outer case 10 oppositely facing each other from the outside, and the connecting portion 102 connecting the pair of reinforcing walls 101 to each other. That is, the restricting member 200 that forms a part of the reinforcing member 100 can function as a member that suppresses the deformation, to the outside, of the peripheral wall portion 11b of the lid body 11 that forms a part of the wall portion 16 of the outer case 10. To be more specific, the deformation of the peripheral wall portion 11b of the lid body 11 caused by the deformation of the wall portion 13a of the body portion 12 to the outside (the lower end of the peripheral wall portion 11b is inclined to open outward) is suppressed by the restricting member 200 that forms a portion of the reinforcing member 100. As described above, according to the reinforcing member 100 of the present embodiment, the expansion of the wall portion 16 formed of the body portion 12 and the lid body 11 can be suppressed, and as a result, the safety of the energy storage apparatus 1 is enhanced.

(Modification)

The energy storage apparatus according to the present invention has been described above based on the embodiment. However, the present invention is not limited to the above-mentioned embodiment. Modes obtained by applying various modifications made by those skilled in the art to the above-mentioned embodiments are also included in the scope of the present invention without departing from the gist of the present invention.

The two connecting portions 102 included in the reinforcing member 100 are not necessarily disposed in an oppositely facing manner. The reinforcing member 100 may have a connecting portion 102 that connects end portions of the pair of reinforcing walls 101 on the Y-axis direction negative side to each other, and a connecting portion 102 that connects end portions of the pair of reinforcing walls 101 on the Z-axis direction negative side to each other. The number of the connecting portions 102 included in the reinforcing member 100 may be 1 or 3 or more. That is, it is sufficient for the connecting portion 102 to connect the pair of reinforcing walls 101 to each other so as to restrain the pair of reinforcing walls 101 disposed opposite to each other in the X axis direction in the X axis direction, and the shape, the number, the arrangement position, and the like of the connecting portion 102 are not particularly limited.

The reinforcing member 100 is not necessarily formed of the combination of the first reinforcing member 110 and the second reinforcing member 120. After the connecting portion 102 and the reinforcing wall 101 are manufactured as separate members, the connecting portion 102 and the reinforcing wall 101 may be connected to each other by welding, fastening, or the like. That is, provided that the energy storage apparatus 1 includes the pair of reinforcing walls 101 and at least one connecting portion 102 connecting the pair of reinforcing walls 101 to each other, and the rigidity of the reinforcing wall 101 is higher than the rigidity of the connecting portion 102, the number, the shape, and the like of the members constituting the reinforcing member 100 are not particularly limited. In this supplementary term, "provided that the rigidity of the reinforcing wall 101 is higher than the rigidity of the connecting portion 102," may be read as "when the thickness of the reinforcing wall 101 is larger than the thickness of the connecting portion 102". In any case, the deformation of the outer case 10 (expansion of the wall portion 13) can be effectively suppressed by the reinforcing member 100. Accordingly, the safety of the energy storage apparatus 1 is enhanced.

Each of the reinforcing member 100 and the restricting member 200 is not necessarily made of metal. Each of the reinforcing member 100 and the restricting member 200 may be formed of a non-metallic material having high rigidity such as fiber-reinforced plastic.

The energy storage apparatus 1 may not include the restricting member 200. The energy storage apparatus 1 includes at least the reinforcing member 100 as the member for reinforcing the outer case 10 and hence, it is possible to enhance the safety of the energy storage apparatus 1 as described above.

The configurations that are formed by arbitrarily combining the above-described plurality of constituent elements also fall within the scope of the present invention.

INDUSTRIAL APPLICABILITY

The present invention is applicable to an energy storage apparatus that includes energy storage devices such as lithium ion secondary batteries or the like.

DESCRIPTION OF REFERENCE SIGNS

1: energy storage apparatus
10: outer case 11: lid body 11b: peripheral wall portion
12: body portion 13, 13a, 13b, 16: wall portion
13e: rib
14: joint portion 15: opening portion
20: energy storage device
21: case
21a: long-side surface
100: reinforcing member
101: reinforcing wall
102: connecting portion
110: first reinforcing member
111, 121: plate-shaped portion 120: second reinforcing member
200, 210, 220, 230: restricting member
201: contact portion
202: fixing portion

The invention claimed is:

1. An energy storage apparatus comprising:
an outer case that accommodates an energy storage device; and
a reinforcing member including:
a pair of reinforcing walls disposed so as to sandwich two wall portions of the outer case from an outside of the outer case, the two wall portions oppositely facing each other; and
a connecting portion that connects the pair of reinforcing walls to each other, wherein
rigidity of each of the pair of reinforcing walls is higher than rigidity of the connecting portion.

2. The energy storage apparatus according to claim 1, wherein the pair of reinforcing walls is connected by the connecting portion disposed on each of both sides in a width direction that intersects with an oppositely facing direction of the two wall portions.

3. The energy storage apparatus according to claim 1, wherein the energy storage device includes a case that includes a pair of long-side surfaces oppositely facing each other, and a plurality of the energy storage devices are accommodated in the outer case, the plurality of the energy storage devices being arranged side by side such that the pair of long-side surfaces faces the oppositely facing direction of the two wall portions.

4. The energy storage apparatus according to claim 1, wherein
the reinforcing member includes a first reinforcing member and a second reinforcing member,
each of the first reinforcing member and the second reinforcing member includes two plate-shaped portions disposed opposite to each other and the connecting portion connecting the two plate-shaped portions, and
each of the pair of reinforcing walls is formed by making one of the two plate-shaped portions of the first reinforcing member and one of the two plate-shaped portions of the second reinforcing member overlap with each other.

5. An energy storage apparatus comprising:
an outer case that accommodates an energy storage device; and
a reinforcing member including:
a pair of reinforcing walls disposed so as to sandwich two wall portions of the outer case from an outside of the outer case, the two wall portions oppositely facing each other; and
a connecting portion that connects the pair of reinforcing walls to each other, wherein
the reinforcing member includes a first reinforcing member and a second reinforcing member,
each of the first reinforcing member and the second reinforcing member includes two plate-shaped portions disposed opposite to each other and the connecting portion connecting the two plate-shaped portions, and
each of the pair of reinforcing walls is formed by making one of the two plate-shaped portions of the first reinforcing member and one of the two plate-shaped portions of the second reinforcing member overlap with each other.

6. An energy storage apparatus comprising:
an outer case that accommodates an energy storage device; and
a reinforcing member including:
a pair of reinforcing walls disposed so as to sandwich two wall portions of the outer case from an outside of the outer case, the two wall portions oppositely facing each other; and
a connecting portion that connects the pair of reinforcing walls to each other, wherein
a thickness of each of the pair of reinforcing walls is larger than a thickness of the connecting portion.

* * * * *